March 7, 1961 O. L. GARRETSON 2,973,728
ANHYDROUS AMMONIA METERING DISPENSER
Filed Jan. 9, 1956 4 Sheets-Sheet 1

INVENTOR.
Owen L. Garretson
BY
Atty.

March 7, 1961  O. L. GARRETSON  2,973,728
ANHYDROUS AMMONIA METERING DISPENSER
Filed Jan. 9, 1956  4 Sheets-Sheet 2

INVENTOR.
Owen L. Garretson
BY
Atty.

March 7, 1961 O. L. GARRETSON 2,973,728
ANHYDROUS AMMONIA METERING DISPENSER
Filed Jan. 9, 1956 4 Sheets-Sheet 4

INVENTOR.
Owen L. Garretson
BY
Atty

United States Patent Office 2,973,728
Patented Mar. 7, 1961

2,973,728
ANHYDROUS AMMONIA METERING DISPENSER

Owen L. Garretson, Roswell, N. Mex., assignor to The Bastian-Blessing Company, Chicago, Ill., a corporation of Illinois Filed Jan. 9, 1956, Ser. No. 557,888

8 Claims. (Cl. 111—6)

This invention relates to an anhydrous ammonia metering dispenser and more particularly to an apparatus and method for maintaining the anhydrous ammonia in its liquid phase and at a constant pressure density relationship as it passes through a metering orifice in dispensing it as a fertilizer.

The present device has particular application to the operation of placing and dispersing anhydrous ammonia liquid and vapor for direct and immediate adsorption in the ground in furrows as they are being created by plowshares or knives. It will be readily appreciated that the flow of anhydrous ammonia should be uniform in quantity because where there is too little product, there is a deficiency, and time and effort have been wasted, and where there is too much introduced into the furrows, material has been wasted and the excess is likely to cause injury to the plants and to cause the formation of products harmful to the soil.

Although devices including pressure regulators, metering orifices and flow regulating valves have been used in the dispensing of anhydrous ammonia in an endeavor to provide a uniform flow, the flow is still irregular and uneven conventionally because of pressure drops and vaporization occurring ahead of the metering device. Also, the starting and stopping of the flow between furrows to turn the knives around adds greatly to the problem. Variations in pressure not only vary flow characteristics at a metering orifice, but also cause some of the fluid that is being metered to vaporize. Thus, with fluid in both its liquid and vapor phases passing through the orifice, dispensing results are erratic. Particularly, the flow is starved while vapor is passing through the orifice. Moreover, when starting and stopping the flow, other conditions affecting uniformity of flow are involved such as continued expansion of liquid beyond the control valve after the flow is shut off; the delay in reaching full flow when starting again; and, the flow variations arising from the effect of temperature changes in the dispensing parts between and during flow periods.

It is accordingly an object of the present invention to provide a metering dispenser for anhydrous ammonia which will maintain the ammonia in its liquid phase during its metering so that an even flow of product is provided into the soil at all times during operation.

Another object of the invention is to provide a metering dispenser for anhydrous ammonia in which heat exchange is provided between the anhydrous ammonia flowing from the metering device and the anhydrous ammonia that is flowing in its liquid phase to the metering device. The absorption by the metered fluid of latent heat of vaporization from the inflowing fluid lowers the temperature and increases the density and thereby lowers the effective vapor pressure of the inflowing fluid to a point below the pressure occurring at the orifice of the metering device. This assures the preservation of the inflowing fluid in its liquid phase as it passes through the orifice of the metering device and also assures a constant pressure density flow relationship.

Another object of the invention is to provide a manual shut-off valve which is disposed downstream from the regulator valve of the device, yet as close to the point of heat exchange and metering orifice as possible. The close proximity of the shut-off valve to the metering orifice and heat exchange point affords the quickest possible refrigeration of the inflowing fluid for quick starts, uniform flow and quick shutoffs.

Another object of the invention is to provide a metering dispenser for anhydrous ammonia in which outflowing and inflowing fluids on opposite sides of a closely coupled pressure regulator and metering orifice assembly are brought into effective heat exchange relationship with each other to chill the inflowing fluid in its liquid phase to a lower temperature and lower the effective vapor pressure thereof to less than the absolute pressure existing on the outflowing fluid at the metering orifice.

Another object of the invention is to provide a metering dispenser of the type indicated in which a vaporizing labyrinth for outflowing fluid is provided that assures the ready absorption of sensible heat from inflowing liquid to maintain the inflowing liquid in its liquid phase while being metered.

Yet another object of the invention is to provide a metering dispenser of the type indicated in which the metering of the liquid flow is accomplished ahead of the valve that varies the differential pressure with the density of the liquid to maintain a constant differential pressure density relationship after the incoming liquid has been refrigerated to prevent vaporization during metering.

A further object resides in the construction and arrangement of parts so that all valves, screws and manually operated elements are readily accessible for repair, cleaning and replacement individually without disturbing other elements and assemblies and can be inspected by the use of tools commonly found upon farms.

Other objects and advantages of the invention will become apparent as the description proceeds in accordance with the drawings, in which.

Although the device illustrated is shown as mounted in a preferred position, its mounting could be upside down to that shown if the vaporization labyrinth was larger.

The invention contemplates liquid eduction of anhydrous ammonia under its vapor pressure from a storage tank; removing sensible heat from the educted liquid to chill it down until it has an effective temperature that provides a vapor pressure that is at least one pound less than the vapor pressure of the liquid in the tank as it exists at a particular point, having in mind such factors as vertical lift and effects of sun heats; metering the liquid through a metering orifice and reducing its pressure at the orifice outlet to approximately one pound per square inch below the pressure at the orifice inlet pressure to maintain a constant pressure density flow relationship, releasing heat as latent heat of vaporization to the inlet stream from the outlet stream after the pressure reduction to vaporize some of the fluid, and swirling the fluid across outlet openings in a manifolding system to divide the fluid equally into separate streams that are conducted to furrows in the ground.

Figure 7:
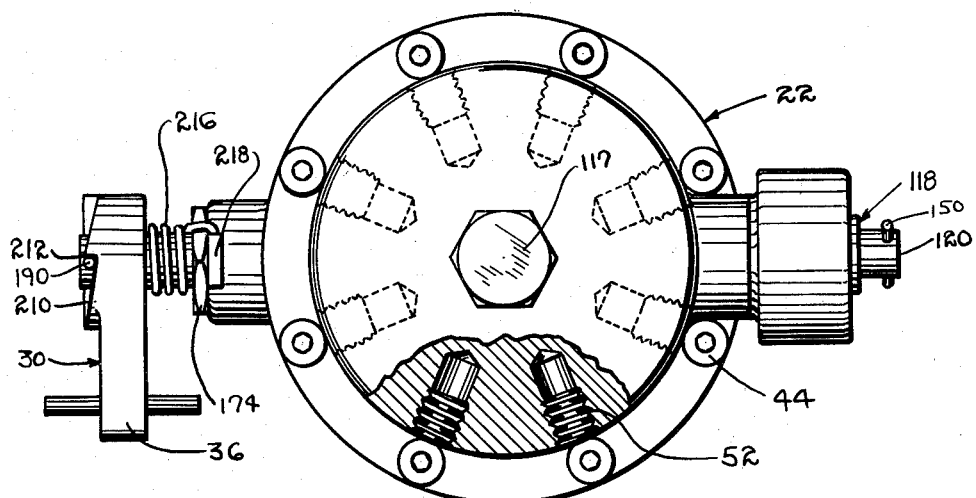
Fig. 7 is a bottom plan view of the dispenser partly in section.
Figure 1:
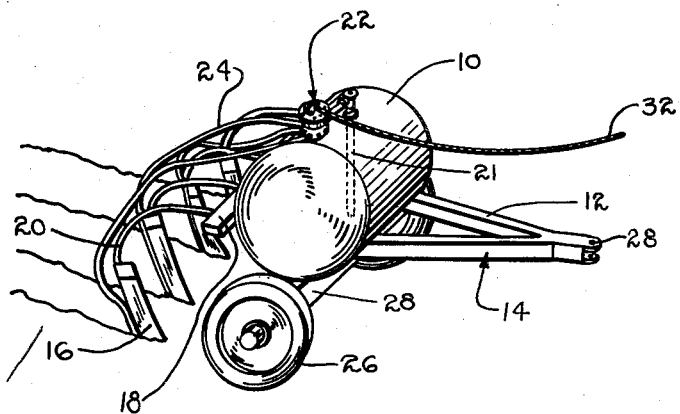
Fig. 1 is a perspective view of a cultivator adapted for use in dispensing anhydrous ammonia for intimate and immediate contact with the soil.

Referring now to Fig. 1, a storage tank 10 containing liquefied anhydrous ammonia is carried on a frame 12 of a cultivator 14 that has wheels 26 and a draw bar 28 so that it can be drawn across a field by suitable power such as a tractor. A plurality of cultivator blades 16 are secured to a gang bar 18 on the cultivator by means of arms 20 to plow furrows through the field when in motion.

A metering dispenser 22 for the anhydrous ammonia in the tank 10 is suitably secured at its inlet to an eduction pipe 21 extending to a point near the bottom of the tank 10. A manifold is provided at the outlet of the dispenser for a plurality of conduits 24 leading from the dispenser to positions behind the cultivator blades 16. The terminal portions (not shown) of the conduits are disposed in a position where they will dispense liquid and vapor anhydrous ammonia directly into contact with the moist soil directly to the sides of the furrows behind the plow shares for immediate absorption by the soil.

The metering dispenser 22 is also provided with a quarter-turn ratchet operated shut-off valve 30 as operated by a fair-lead 32 that is attached to an ear 34 of an arm 36 (Fig. 3) for intermittent operation of the dispenser as will be later described, in which one pull on the fair-lead opens the valve, the next closes it, and the next opens it, etc.

Figure 2:
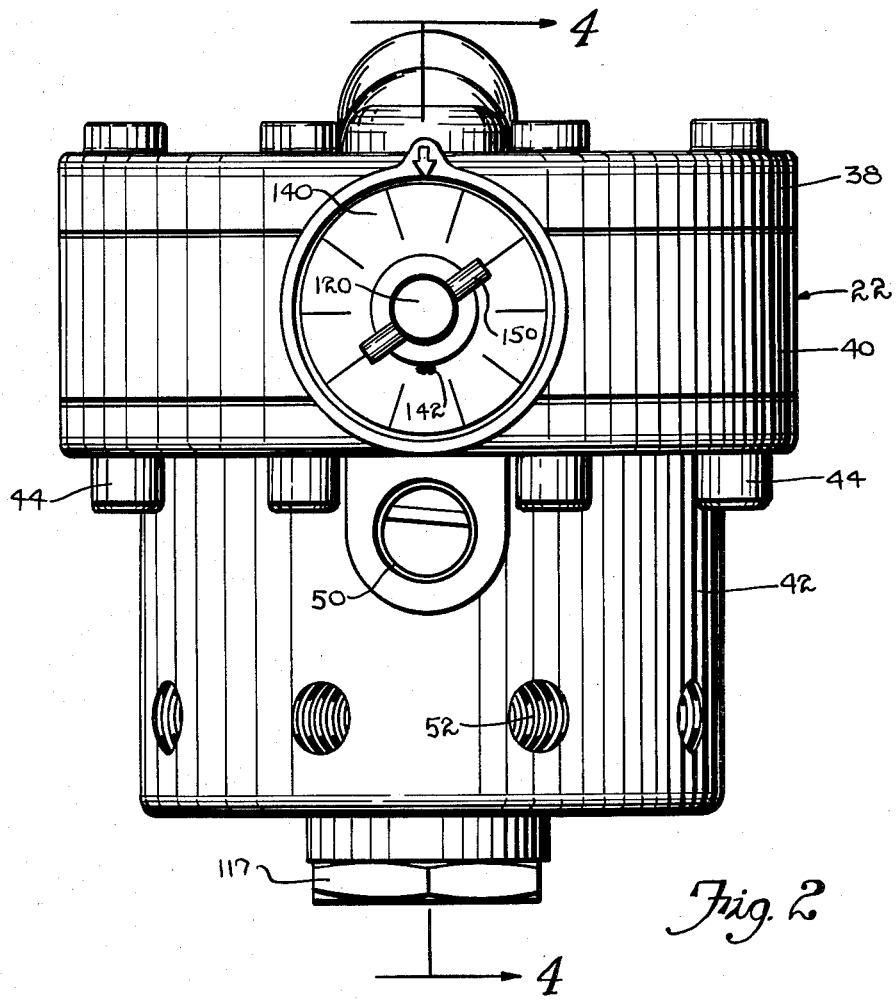
Fig. 2 is a side elevational view of the metering dispenser for anhydrous ammonia according to the invention.

Referring now to Fig. 2, the metering dispenser 22 includes a bonnet or upper body 38, a center body assembly 40 and a lower body 42. The individual body sections 38, 40 and 42 are secured together by means of a plurality of bolts 44 extending peripherally through the said body elements to hold them in sealed relationship.

Figure 8:
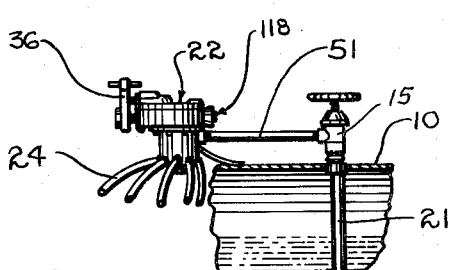
Fig. 8 is a side elevational view of the construction shown in Fig. 1 with the storage tank cut away to show the eduction relationship.
Figure 4:
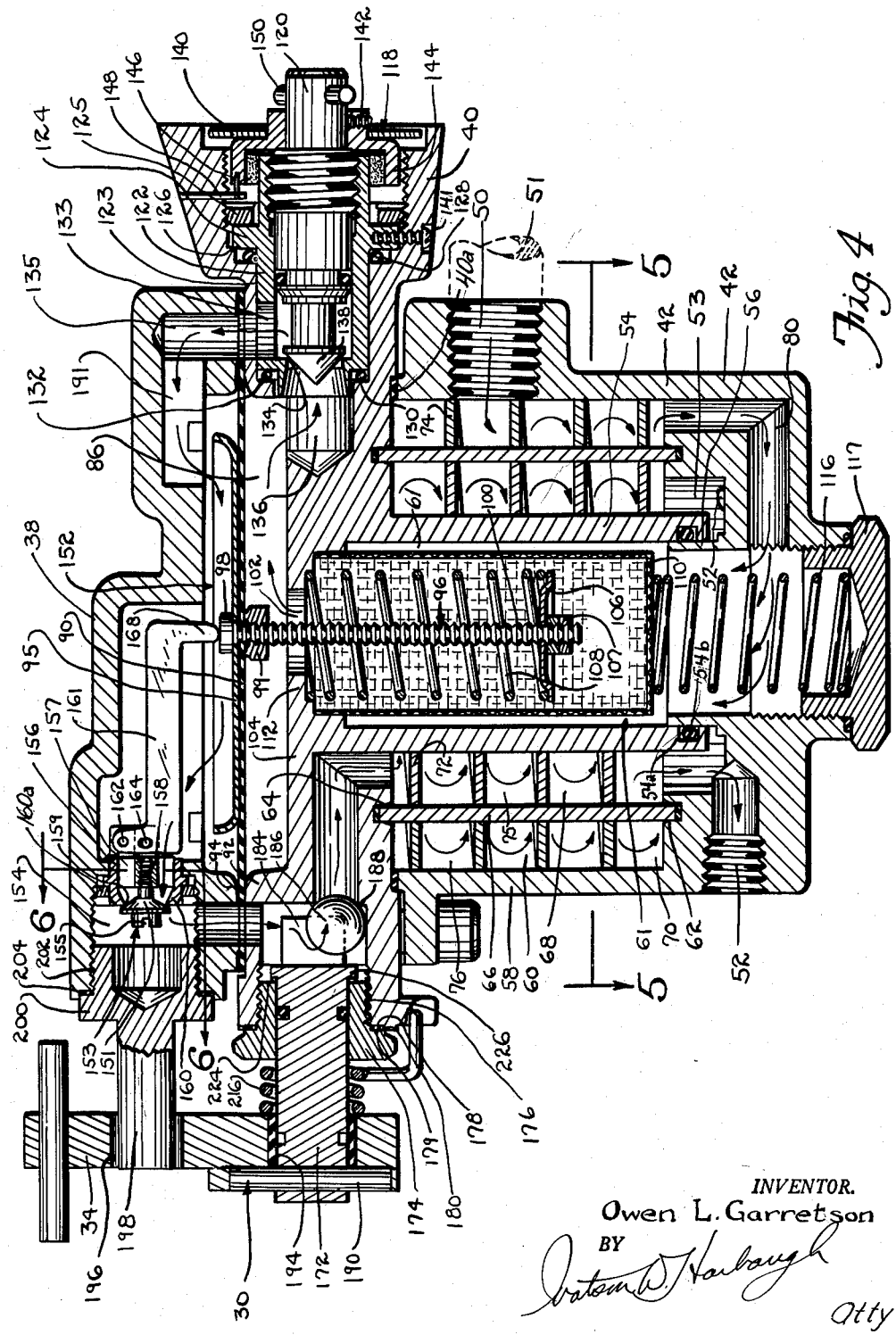
Fig. 4 is a vertical sectional view of the dispenser taken along the line 4—4 of Fig. 2.

As shown in Fig. 4, the lower body portion 42 has at least one inlet 50 threaded internally for connection as shown in Fig. 8 with a suitable inlet conduit 51 that includes a manual shut-off valve 15 which supports the dispenser on the eduction pipe 21 of the tank 10. Preferably, a plurality of radially disposed outlets 52 opening through the bottom of an inside annular groove 53 in the bottom thereof forms a discharge manifold.

The center body assembly 40 is provided with a central depending cylindrical wall 54 internally grooved at 54a at its lower end to receive an O-ring seal 54b which establishes a telescoping sealed relationship with a cylindrical wall 56 extending upwardly from the bottom of said groove 53 in the bottom wall of the lower body portion 42. The cylindrical wall 54 is disposed in telescoped relationship within a vertical external cylindrical wall 58 of the lower body portion. Accordingly, a chamber 60 is formed between the external wall 58 of the lower body portion 42 and the cylindrical wall 54 of the central body portion 40, and also a chamber 61 inside the cylindrical wall 54. The O-ring seal 54b permits the sealing of the external wall 54 with the central body assembly 40 at the gasket 40a without need for close tolerances between the mating points.

The lower body is provided with an annular groove 62 and the central body with a groove 64 adapted to retain therein a cylindrical metal wall or tube 66 of excellent heat conductive properties. This tube as disposed centrally between the walls of the central body and the lower body, respectively, divides the chamber 60 into an outlet or internal annular chamber 68 and an inlet or exterior annular chamber 70. Mounted within the interior chamber 68 as supported by the lower body 42 is a spiral or helical steel baffle 72 providing a continuous passageway 75 adjacent the wall 66 which directs flowing liquid into the manifold 53 with a swirling action. A second helical steel baffle 74 is secured in the chamber 70 to provide a second continuous passageway 76 in chamber 70.

When liquid anhydrous ammonia from the tank 10 is introduced into the inlet 50, it will circulate through the passageway 76 and enter conduit 80 in the lower body 42, whereupon it will pass upwardly through the central chamber 61, through an opening 102 in the body 40 and into a recess on the top of the center member that serves as a valve compartment 86. The compartment 86 is closed by means of a diaphragm 90 which is secured between the wall 92 of the central body 40 and a wall 94 mating therewith which defines a corresponding valve cavity in the upper body 38.

The diaphragm is preferably formed of a flexible material such as a synthetic elastomer which is impervious to $NH_3$. In supporting the diaphragm, a diaphragm plate 95 is mounted centrally upon the diaphragm 90 by means of a bolt 96 clamping the diaphragm and plate together between head 98 and a nut 99 engaging the plate and diaphragm on opposite sides. The shank 100 of the bolt is received through the opening 102 in the bottom 104 of the cavity 86 to receive a compression spring 108 and retainer plate 106 which is retained in abutting relation with the wall 104 by an adjusting nut 107 located in the chamber 61.

A cylindrical filter screen 110 is positioned, as shown in Fig. 4, against a shoulder 112 at the top and is held in place by a spring 116 at the bottom which is compressed between the filter screen 110 and the plug 117. Thus the fluid, as it passes upwardly through central chamber 61 and opening 102 into the chamber 86 as described, is filtered. A combination valve adjustment and sediment plug 117 is threadedly received in bottom wall 56 to permit easy removal of the screen and any impurities collected thereon when the manual shut-off valve 15 closed.

The fluid is metered as it leaves the chamber 86 by a metering valve assembly, referred to generally by reference numeral 118, which includes a valve stem 120 threadedly received in a sleeve 122 having a metering orifice 134 at its inner end. The valve sleeve is retained in an opening 123 of the central body 40 by means of a retaining ring 125 engaging an annular flange 124 on the valve sleeve and holding the flange 124 against a shoulder 126 as sealed by the gasket or O-ring 128. The inner end of the opening 123 has an annular shoulder 130 adapted to receive a gasket or O-ring 132 in sealing relationship between it and the inner end of the valve sleeve 122. The valve seat is in communication with the chamber 86 through a bore 136 in the central body 40 and with the compartment 191 through a hole 133 in the side of the sleeve 122 and bores 135 in the upper body 38. It will be apparent that all of these parts are readily removable as a subassembly when the retaining ring 126 is loosened.

The valve stem 120 has a conical head 138 adjustable with respect to the metering orifice 134 by rotation of the stem 120 and carries a dial 140 which is secured thereto by a set screw 142. The dial preferably has indicia thereon to indicate the amount of fluid being metered. An inwardly turned flange 144 of the dial has a pin 146 disposed axially therein which is adapted to engage a pin 148 in the opening 123 to provide a stop when the dial has been rotated for substantially a complete revolution. In order to permit easy actuation of the valve stem 120, a cross pin handle 150 is provided on the outer end thereof and the relative working portions of the parts are maintained against rotation by a retainer screw 141.

A uniform drop in pressure across the metering orifice 134 is maintained by a differential pressure regulator 152 so located that the valve 153 thereof is disposed between the upper chamber 191 and a passage 154 which leads to the inner chamber 68. The differential preferably is in the neighborhood of one p.s.i., as measured on opposite sides of the diaphragm itself, namely, as between the lower chamber 86 and the upper chamber 191. Thus the flow of liquid through the orifice between these two chambers is only that which occurs with approximately a one pound pressure differential, the pressure differential increasing slightly as the tank pressure increases to compensate for the reduction in the density of the liquid occurring with increased temperatures. This compensation effect throughout the expected range of tank pressures and temperatures is correct in amount.

Figure 6:
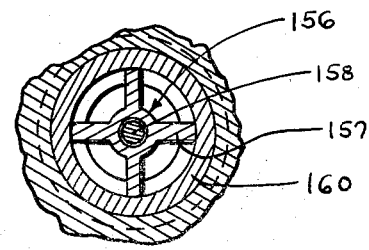
Fig. 6 is a vertical sectional view taken along the line 6—6 of Fig 4.

The regulator valve 153 comprises a conical valve head 151, having a slot 155 therein for adjustment, and is threadedly secured in a guide disc 156 by means of a stem 158. The guide disc 156 has guide ribs 157 axially thereof, as shown in Fig. 6, and is slidably received in a valve seat 160, as driven by an L-shaped lever 161. The lever is in turn pivotally secured to the valve seat 160 at its toe and to the guide disc 156 at its heel by means of pivot pins 162 and 164 respectively. The arm 168 of the lever rides against the head 98 in the center of diaphragm 90 as urged by the valve 153 as it opens with the flow of fluid through the valve port 159.

Here again it will be observed that the regulator valve assembly is readily accessible even to the arm 161 when a retainer ring 160a is removed. When the pressure in chamber 191 tends to rise to the pressure that is present in chamber 86, the diaphragm moves towards chamber 86 as carried by the spring 108 and the lever 161 follows to permit a wider opening of the valve 153 to drain the chamber 191 and prevent the rise. Likewise, when the pressure in chamber 191 tends to be lowered by flow of liquid out of the valve 153, the diaphragm will move upwardly to cause the valve head 151 to close the valve slightly and prevent a decrease of pressure in the upper chamber 191. Thus the opening of the regulator valve 153 will automatically adjust itself to the flow of liquid taking place at the metering orifice 134 at the one pound pressure differential, thereby maintaining the pressure differential constant and the flow uniform.

Beyond the regulator valve 153, the pressure drops appreciably during flow conditions. However, a manual shut-off valve 30 is disposed between the pressure regulator valve 153 and the heat exchange wall 66 to stop the flow of fluid at will. The shut-off valve 30 comprises a shut-off stem 172 journalled in a gland nut 174 which is threadedly secured in an opening 176 in the central body portion 40 as sealed by a gasket 178 disposed between an annular shoulder 179 of the gland nut 174 and the recessed outer edge 180 of the opening.

The axis of the stem 172 is offset with respect to the valve seat 188 and the inner end of the stem 172 is provided with a transverse slot 184 adapted to retain therein a ball check 186. The eccentricity of the offset is such that upon each 90° rotation of the stem, as will be hereinafter described, the ball check will either be moved out of closing engagement with the valve seat 188 or moved where it will close against the seat 188.

Figure 3:
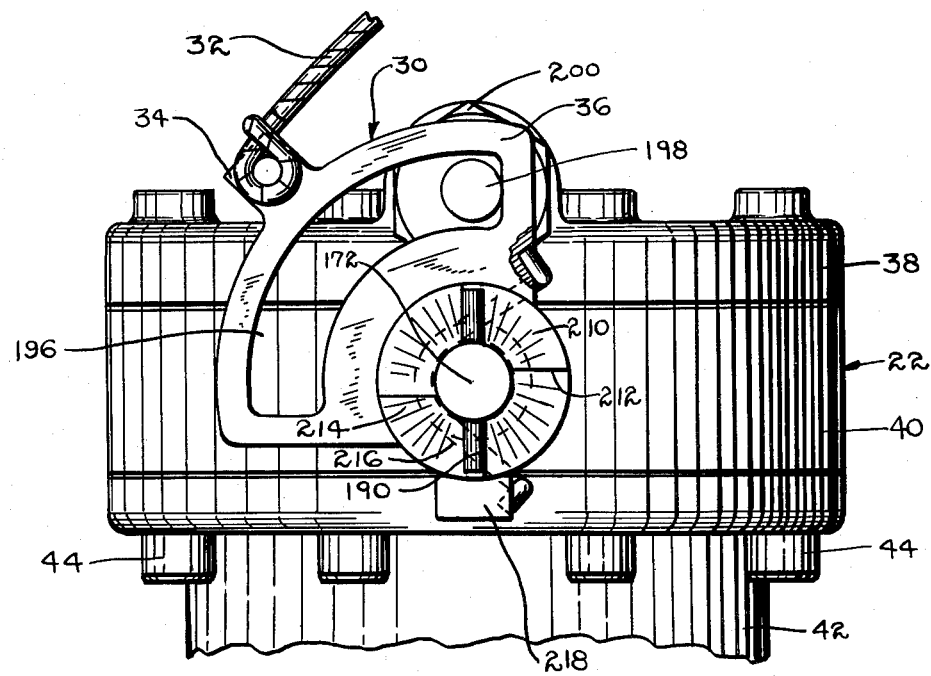
Fig. 3 is a side elevational view, partly broken away, of the metering dispenser.
Figure 5:
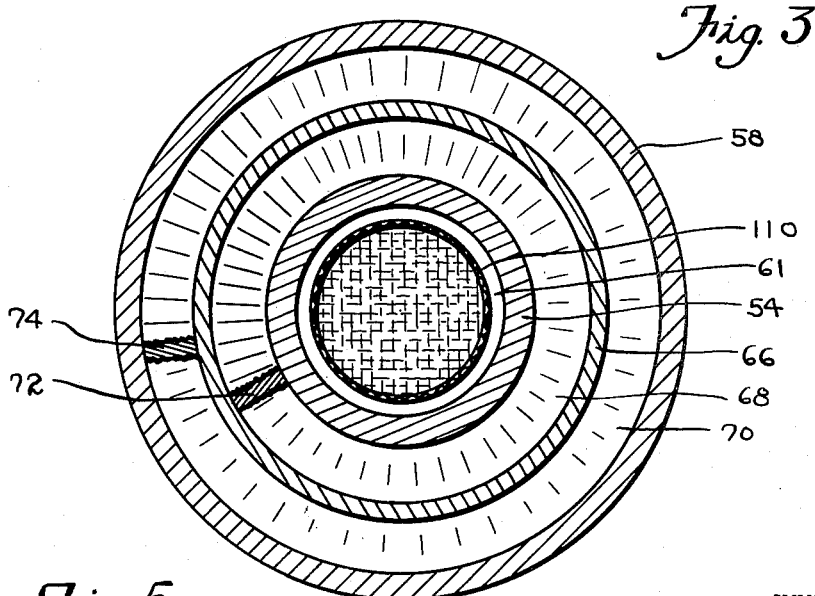
Fig. 5 is a horizontal sectional view of the dispenser taken along the line 5—5 of Fig. 4.

The other end of the valve stem has a cam follower pin 190 set therein to engage cam inclines on the arm 36 and support the arm in journalled relation on the valve stem in cooperation with an intervening nylon sleeve journal 194. The arm 36 has an arcuate slot 196, as seen in Fig. 3, adapted to receive a guide projection 198 on a plug 200 threadedly positioned in an opening 202 in the upper body portion 38 as sealed by a gasket 204.

The arm, pin and cam arrangement provides a four-position valve having four reliefs 210 disposed therearound, each relief having a radial shoulder 212 substantially perpendicular to the plane of the arm 36, and a gradually sloping cam face 214 leading to the next adjacent shoulder 212. A torsion spring 216 is compressed between the gland nut and arm and has one end secured to a flange 218 on central body portion and the other end fastened to the arm 36 at a position adapted to urge the cam lever counterclockwise to the initial position as seen in Fig. 4. When the lever is in this position one of the shoulders 212 is in engagement with the cam pin on the shut-off stem and upon pulling the arm clockwise as by the fair-lead 32 the shut-off stem will rotate to place the ball check in open or closing position, as the case may be. Release of the lever will permit the torsion spring to return the lever to its initial position with the cam pin riding upwardly on the face 214 and then dropping into engagement with the next shoulder 212. The torsion spring 216 is biased outwardly to hold the cam teeth against the cam pin, as well as to position the shut-off stem in operative position in which the inner end 224 of the gland 174 is engaged in sealed relationship by an annular flange 226 on the inner end of the shut-off stem. The shut-off valve is readily accessible for inspection with the removal of the gland 174.

In operation, assuming that the ball check 186 is in its open position and the conical valve head 151 is open as urged by the spring 108, fluid will flow in the inlet 50, through the outer labyrinth 76, up through the filter screen 110, into the valve chamber 86, through the metering orifice 134, into chamber 191, out past the regulator valve 153, past the ball check valve 186, into the labyrinth 75 in heat exchange with liquid in labyrinth 76, and through the manifold outlets 52 to the nozzles behind the cultivator blades 16. The pressure on the fluid will drop one pound across the metering orifice 134 and will ultimately drop to atmospheric pressure beyond the shut-off valve 30 at the shovels 16, it decreasing progressively between the shut-off valve and the shovels.

Thus when the shut-off valve is opened, the fluid will be immediately available for vaporization and refrigeration in labyrinth 75, due to the close proximity of the shut-off valve and the heat exchange means 66 as stated. Also, when the shut-off valve is closed there will be very little residual flow beyond it. However, during flow, latent heat of vaporization will be absorbed by the outflowing fluid in labyrinth 75 from the inflowing liquid in labyrinth 76 through the common wall 66 thereby cooling the incoming fluid before it reaches the metering orifice 134 enough to assure that the fluid will remain in its liquid phase preferably until it reaches the pressure valve 153. Even though some vaporization might take place in the regulator chamber 191, the valve 153 will open enough to accommodate the flow of the vapor also without affecting flow of liquid at the metering orifice 134.

Upon leaving the chamber 68, the anhydrous ammonia moves through the outlet ports 52 in substantially its liquid and vaporized state, and through the conduits 24 into immediate contact with the moisture in the ground. Precisely the right amount will be provided through each conduit, and no waste will result. Furthermore, the flow through the device can be readily controlled by pulling the fair-lead 32, which is secured to the arm 36 on the shut-off stem 172.

The device is simple in construction, and by placing incoming and outgoing fluids in thermal contact, so that the fluid which has been metered cools the fluid before metering, an unusual accuracy of metering and even flow is achieved. By placing a manual shut-off valve adjacent the heat exchange means, no time is lost in providing the vaporizing fluid needed for cooling, and the compactness of the parts ensures that the fluid will remain cooled until metering has been accomplished.

Although the invention has been set forth and described with respect to certain principles and details, it will be understood by those skilled in the art that certain changes and modifications may be made without departing from the spirit and scope thereof, as set forth in the following claims.

What is claimed is:

1. The method of dispensing anhydrous ammonia fluid as a fertilizer in a partially vaporized phase comprising storing anhydrous ammonia under its vapor pressure in both its liquid and vapor phases, educting the anhydrous ammonia in its liquid phase under said vapor pressure, removing sensible heat from the educted liquid to chill it and lower its effective vapor pressure and maintain the educted liquid in liquid solid state, confining said chilled liquid under said eduction vapor pressure to flow through a set orifice and reducing the pressure upon the liquid immediately beyond said orifice and maintaining it at a predetermined pressure differential with respect to the pressure ahead of the orifice in which the pressure beyond the orifice is above said effective vapor pressure but below said eduction vapor pressure, thereafter further reducing the pressure on said liquid beyond said orifice to a pressure below said effective vapor pressure and absorbing said removed sensible heat as latent heat of vaporization for vaporizing said liquid at its said further reduced pressure, and conducting the vaporized fluid to a place of consumption in intimate contact with the earth at atmospheric pressure.

2. The method of dispensing anhydrous ammonia fluid as a fertilizer in its vapor phase comprising storing anhydrous ammonia under its vapor pressure in both its liquid and vapor phases, educting the anhydrous ammonia in its liquid phase under said vapor pressure, intermittently removing sensible heat from the educted liquid to chill it and lower its effective vapor pressure to maintain it liquid solid, confining said chilled liquid to flow through a predetermined orifice and simultaneously therewith subjecting it to a predetermined differential drop in pressure in which the pressure upon it beyond the orifice is above said effective vapor pressure but below said eduction vapor pressure, thereafter intermittently reducing the pressure on said liquid to a pressure below said effective vapor pressure, absorbing said removed sensible heat as latent heat of vaporization for vaporizing the liquid during said intermittent operations, and conducting the vaporized fluid to a place of consumption in intimate contact with the earth.

3. A metering dispenser for anhydrous ammonia comprising a housing, an exterior annular chamber in said housing, an interior annular chamber in coaxial relation with said exterior chamber, a helical baffle in each of the chambers to induce a helical flow path for fluids in said chambers, a wall of good heat exchange property separating said chambers, said housing having an inlet port opening into an upper portion of said exterior chamber and an outlet port connecting with the lower end of said interior chamber, a chamber in said housing above said interior and exterior chambers having a diaphragm dividing said chamber into upper and lower compartments, a central passageway leading from the lower end of said exterior chamber into said lower compartment and coaxial with said exterior and said interior chambers, spring means disposed in said central passageway and connected to bias said diaphragm downwardly, a passageway interconnecting the upper and the lower compartments, a metering valve in said interconnecting passageway for metering fluids from said lower portion to said upper portion, a passageway interconnecting the upper compartment and the interior chamber, and valve means in the last mentioned passageway actuated by said diaphragm and spring including a valve element and means interengaging the valve element and diaphragm to move the valve element to its closed position under pressure present in the lower compartment to maintain a predetermined pressure differential between said upper and lower compartments.

4. A dispenser for anhydrous amounts comprising a portable tank exposed to atmospheric temperatures for storing liquefied anhydrous ammonia therein in both its liquid and vapor phases under pressure, a housing having inlet and outlet chambers therein separated from each other by a heat conductive wall, eduction means for connecting the inlet chamber to a point near the bottom of the tank for educting liquefied anhydrous ammonia from the tank to the inlet chamber, a passageway interconnecting said chambers, pressure reducing means in said passageway including a metering orifice at the outlet of said inlet chamber, means for maintaining a predetermined pressure differentail between opposite sides of the metering orifice including a valve at the inlet to the outlet chamber and an element controlling said valve disposed between said opposite sides responsive to the difference in pressure present between the opposite sides, said outlet chamber being open to atmospheric pressure to expand liquefied anhydrous ammonia therein, and said heat conductive wall absorbing heat from the liquid in said inlet chamber to supply same as latent heat of vaporization to the expanding liquefied anhydrous ammonia present in the outlet chamber, and means for conducting the expanded anhydrous ammonia in its vapor phase to a point of use.

5. For use in cultivation, a metering dispenser for anhydrous ammonia comprising a storage tank for liquid anhydrous ammonia, a housing having an inlet port and an outlet manifold, said inlet port communicating with said storage tank near the bottom thereof, a first annular chamber in said housing, a second annular chamber in said housing, a helical baffle in each of said chambers defining a passageway therein, said inlet port entering an upper portion of said passageway in the first chamber, said outlet manifold communicating with a lower portion of said passageway in the second chamber, a heat-conductive wall separating said first and second chambers, means interconnecting said first and second chambers for introducing liquid anhydrous ammonia into the second chamber at a predetermined rate of flow and at a reduced pressure including a metering valve and a differential pressure regulator responsive to the difference in pressures present on opposite sides of the metering valve whereby fluid in the second chamber is vaporized and vapor in the first chamber is refrigerated and liquefied by transfer of heat through said wall, and a plurality of conduits leading from said outlet manifold open to atmospheric pressure.

6. A dispenser for metering anhydrous ammonia and other liquefied gases in their vapor phase comprising a housing having an inlet conduit for liquefied gas and an outlet conduit disposed in heat exchange relationship with each other through a common medium, a passageway interconnecting the conduits, a metering orifice in said passageway between said inlet conduit and outlet conduit, valve means for reducing pressure on liquefied gases to a predetermined differential pressure on opposite sides of said orifice including an outlet valve in said passageway between said orifice and outlet conduit, a diaphragm controlling said outlet valve exposed on opposite sides to the pressures present on opposite sides of said orifice, said gas expanding at reduced pressure as it leaves said outlet valve and enters said outlet conduit to absorb through said common medium sensible heat from the liquefied gas in the inlet conduit and utilize it as latent heat of vaporization whereby said liquefied gas in the inlet conduit is refrigerated in relation to the vaporization of liquefied gas in said outlet conduit.

7. A dispenser for metering anhydrous ammonia and other liquefied gases in their vapor phases comprising a housing having inlet and outlet conduits disposed in heat exchange relationship with each other through a common medium, valve means for maintaining a predetermined pressure differential between said inlet and outlet conduits, said valve means having an inlet and an outlet and comprising a metering orifice connected between said inlet conduit and said inlet and a differential pressure regulator connected between said orifice and outlet conduit, said regulator including a valve at the inlet of said outlet conduit and a member between the opposite sides of said orifice responsive to the difference in pressures on said opposite sides for controlling said valve, the liquefied gas passing through said valve expanding in said outlet conduit at a reduced pressure whereby heat is transferred from liquefied gas in said conduit through said common medium to the liquefied gas in the outlet conduit to refrigerate said liquefied gas in the inlet conduit and vaporize liquefied gas in said outlet conduit, and a shut-off valve in said outlet conduit.

8. A metering and vaporizing device for dispensing anhydrous ammonia fluid in its vapor phase comprising a housing having an inlet conduit and an outlet conduit, an orifice in the inlet conduit, pressure responsive valve means for maintaining a differential of pressures on fluid disposed on opposite sides of said orifice including a member between opposite sides of said orifice and responsive to said pressure differential, means for transmitting fluid from said orifice to the inlet of said outlet conduit at reduced pressure including a fluid flow restricting element controlled by said member for allowing said fluid to expand as it enters said outlet conduit to vaporize said fluid during its passage through said outlet conduit, heat-exchange means between said conduits for conveying latent heat of vaporization to the fluid in said outlet conduit from the fluid in said inlet conduit to lower the effective vapor pressure of the fluid in said inlet conduit, and a shut-off valve disposed in said outlet conduit adjacent said flow restricting element whereby fluid emanating from said shut-off valve upon release thereof is brought into contact with said heat-exchange means immediately.

References Cited in the file of this patent
UNITED STATES PATENTS

| | | |
|---|---|---|
| 2,007,251 | Kniskern | July 9, 1935 |
| 2,022,695 | Stuart | Dec. 3, 1935 |
| 2,285,932 | Leavitt | June 9, 1942 |
| 2,415,251 | Leavitt | Feb. 4, 1947 |
| 2,557,955 | Ewing | June 26, 1951 |
| 2,612,760 | Baggette et al. | Oct. 7, 1952 |
| 2,650,556 | Turner | Sept. 1, 1953 |
| 2,691,358 | Peck | Oct. 12, 1954 |
| 2,752,758 | Tann | July 3, 1956 |
| 2,755,633 | McClain | July 24, 1956 |